United States Patent
Le et al.

(10) Patent No.: US 9,424,380 B2
(45) Date of Patent: Aug. 23, 2016

(54) AUGMENTED SIMULATION METHOD FOR WAVEFORM PROPAGATION IN DELAY CALCULATION

(71) Applicant: Synopsys, Inc., Mountain View, CA (US)

(72) Inventors: Jiayong Le, Santa Clara, CA (US); Peivand Fallah Tehrani, Campbell, CA (US); Li Ding, San Jose, CA (US); Xin Wang, Pasadena, CA (US); Ahmed Shebaita, Santa Clara, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/479,032

(22) Filed: Sep. 5, 2014

(65) Prior Publication Data

US 2016/0070834 A1    Mar. 10, 2016

(51) Int. Cl.
    *G06F 9/455*    (2006.01)
    *G06F 17/50*    (2006.01)

(52) U.S. Cl.
    CPC ....... *G06F 17/5031* (2013.01); *G06F 2217/84* (2013.01)

(58) Field of Classification Search
    USPC .......................... 716/104, 106, 107, 108, 113
    See application file for complete search history.

(56) References Cited

U.S. PATENT DOCUMENTS

| | | | | |
|---|---|---|---|---|
| 2005/0232066 | A1* | 10/2005 | Ishibashi | G06F 17/5036 365/189.03 |
| 2006/0143584 | A1* | 6/2006 | Carrere | G06F 17/5036 716/113 |
| 2006/0200784 | A1* | 9/2006 | Ding | G06F 17/5036 716/113 |
| 2015/0193569 | A1* | 7/2015 | Tam | G06F 17/5059 716/113 |

* cited by examiner

*Primary Examiner* — Brian Ngo
(74) *Attorney, Agent, or Firm* — Fenwick & West LLP

(57) ABSTRACT

A system and a method are disclosed for performing static timing analysis. Information describing a distorted input waveform is received by a static timing analyzer. A transition time of the distorted input waveform is determined. Based on the determined input transition time a nominal input waveform and a corresponding nominal output waveform are received. An input waveform distortion is computed based on the nominal input waveform and the distorted input waveform. An output waveform distortion is computed based on an augmented circuit and the input waveform distortion. A distorted output waveform is computed based on the nominal output waveform and the output waveform distortion. The waveforms are represented using the distortion values which are smaller than the actual waveform values, thereby allowing for compact representation. A time-shifted version of an uncoupled input waveform is used to perform conservative timing analysis of circuits that accounts for crosstalk in the circuit.

19 Claims, 13 Drawing Sheets

AUGMENTED SIMULATION METHOD FOR WAVEFORM PROPAGATION IN DELAY CALCULATION

BACKGROUND

1. Field of Art

The disclosure generally relates to the field of static timing analysis and more specifically to capturing the effect of waveform distortion in a static timing analysis.

2. Description of the Related Art

Integrated circuit designs are simulated to assess their performance and determine whether the design works as expected. For instance a circuit design may be simulated to determine the behavior of the circuit design in response to certain input signals. Circuit designs may also be analyzed to determine whether the different stages of the circuit meet certain timing requirements. For instance, a circuit design is analyzed to determine whether the propagation delay of a timing path is within the setup time and the hold time of a flip-flop connected to the end of the timing path.

As the density of components in integrated circuits increases and feature width becomes smaller, the cell delays become more sensitive to input waveform shapes. At high densities of integrated circuits, the waveform distortion becomes stronger due to low operating voltage, longer relative interconnect length, and stronger miller capacitance. Existing simulation techniques, for example, systems that perform composite current source timing calculations are efficient at runtime but provide less accurate results due to waveform shape distortion. Other existing techniques, for example, systems that perform full-waveform composite current source noise calculations provide high accuracy but are slow since they perform intensive circuit simulation. Accordingly, current techniques can either achieve good performance or achieve high accuracy but fail to achieve both.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The FIGS. and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments of a disclosed system, method and computer readable storage medium perform static timing analysis for distorted input waveforms. Information describing a distorted input waveform is received by a static timing analyzer. A transition time of the distorted input waveform is determined. Based on the determined input transition time a nominal input waveform and a nominal output waveform are received. An input waveform distortion is computed based on the nominal input waveform and the distorted input waveform. An output waveform distortion is computed based on an augmented circuit and the input waveform distortion.

Computing Machine Architecture

Figure 1:
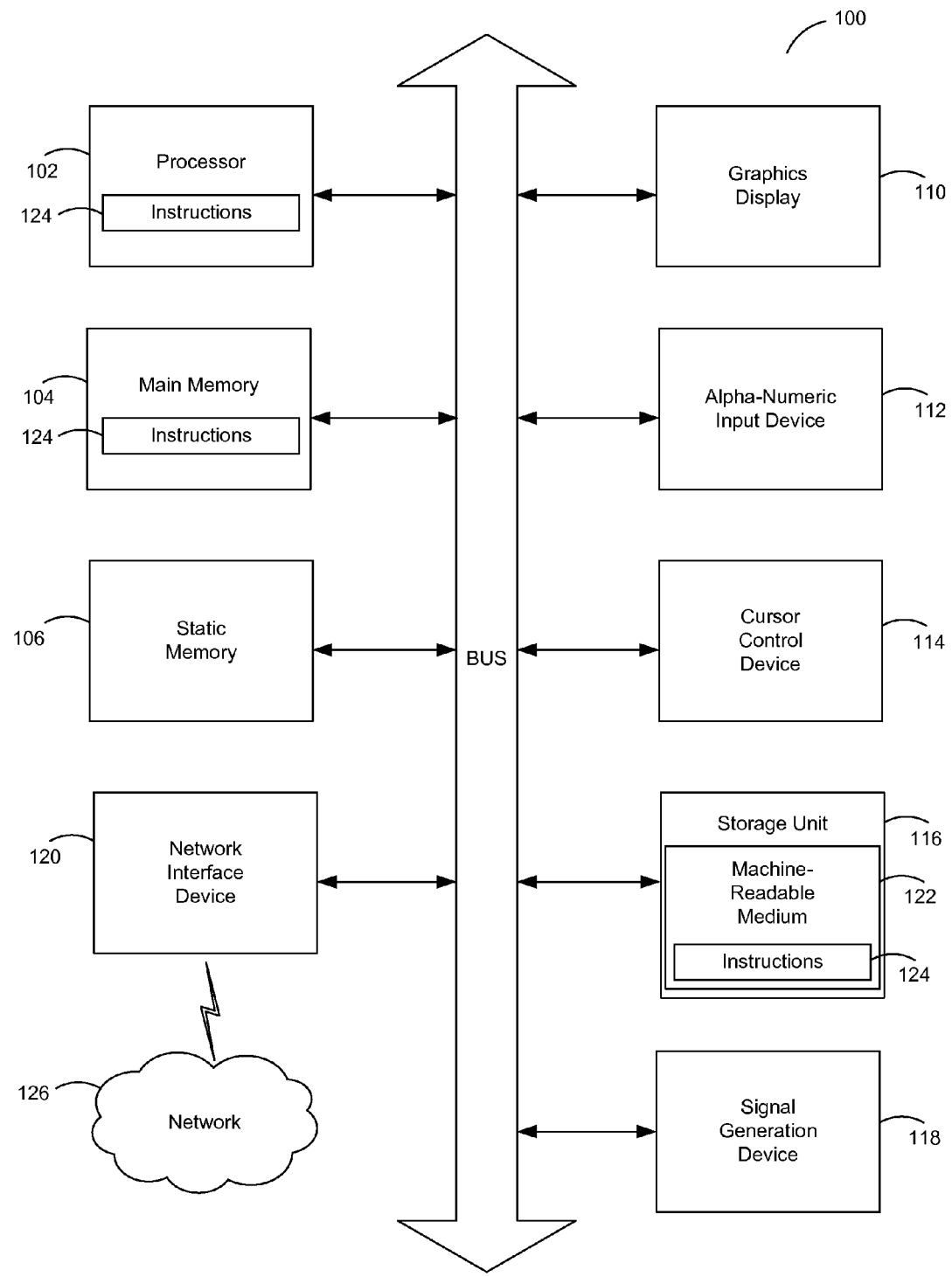
FIG. 1 illustrates one embodiment of components of an example machine able to read instructions from a machine-readable medium and execute them in a processor (or controller).

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 820, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Overview of EDA Design Flow

Figure 2:
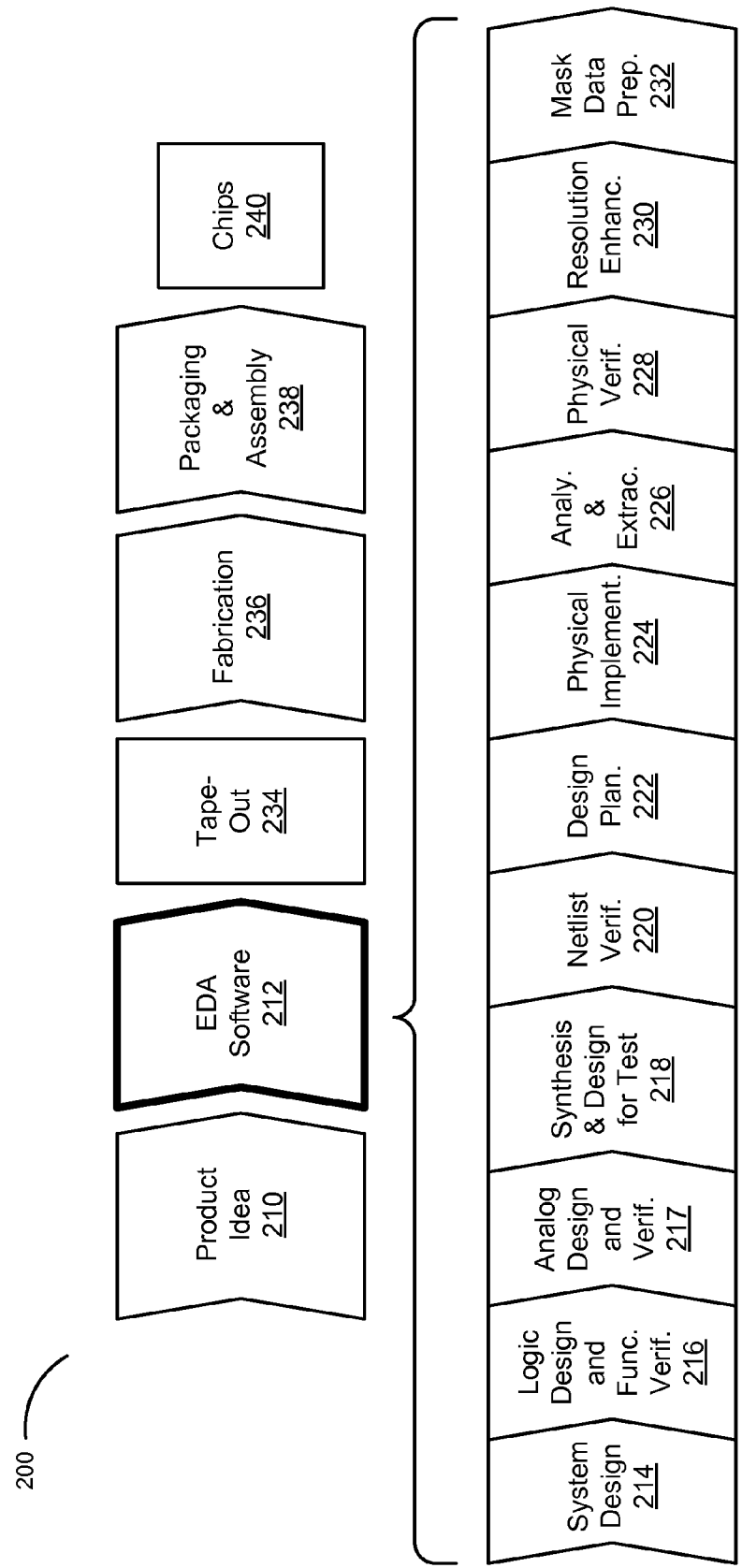
FIG. 2 illustrates a flowchart illustrating various operations in the design and fabrication of an integrated circuit, according to one embodiment.

FIG. 2 is a flowchart 200 illustrating the various operations in the design and fabrication of an integrated circuit. This process starts with the generation of a product idea 210, which is realized during a design process that uses electronic design automation (EDA) software 212. When the design is finalized, it can be taped-out 234. After tape-out, a semiconductor die is fabricated 236 to form the various objects (e.g., gates, metal layers, vias) in the integrated circuit design. Packaging and assembly processes 238 are performed, which result in finished chips 240.

The EDA software 212 may be implemented in one or more computing devices such as the computer 100 of FIG. 1. For example, the EDA software 212 is stored as instructions in the computer-readable medium which are executed by a processor for performing operations 214-232 of the design flow, which are described below. This design flow description is for illustration purposes. In particular, this description is not meant to limit the present disclosure. For example, an actual integrated circuit design may require a designer to perform the design operations in a difference sequence than the sequence described herein.

During system design 214, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During logic design and functional verification 216, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, 10 Designware®, Magellan®, Formality®, ESP® and Leda® products.

During analog design, layout, and simulation 217, analog circuits are designed, layed out, and simulated to ensure both functionality and performance. Example EDA software products from Synopsys, Inc. of Mountain View, Calif. that can be used at this stage include: Custom Designer®, Hspice®, HspiceRF®, XA®, Nanosim®, HSim®, and Finesim® products.

During synthesis and design for test 218, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 220, the netlist is checked for compliance with timing constraints and for correspondence with the VHDL/Verilog source code. Example EDA software products from Synopsys, Inc. of Mountain View, Calif. that can be used at this stage include: Formality®, PrimeTime®, and VCS® products.

During design planning 222, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 224, the placement (positioning of circuit elements) and routing (connection of the same) occurs. Example EDA software products from Synopsys, Inc. of Mountain View, Calif. that can be used at this stage include: the Astro® and IC Compiler® products.

During analysis and extraction 226, the circuit function is verified at a transistor level, which permits refinement. Example EDA software products from Synopsys, Inc. of Mountain View, Calif. that can be used at this stage include: Astrorail®, Primerail®, PrimeTime®, and Star RC/XT® products.

During physical verification 228, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 230, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 232, the 'tape-out' data for production of masks to produce finished chips is provided. Example EDA software products from Synopsys, Inc. of Mountain View, Calif. that can be used at this stage include the CATS® family of products.

Embodiments of the present disclosure can be used during one or more of the above-described stages. Specifically, embodiments may be used for the processes of design planning 222 and physical implementation 224.

Static Timing Analysis

A static timing analysis tool or static timing analyzer computes timing information for a circuit design. By using a static timing analyzer, a designer can determine whether the circuit design contains any timing violations, such as a hold time violation or a setup time violation. Static timing analyzers may determine a timing slack for the various timing paths of the circuit design. As used herein, timing slack is the difference between the target delay time of a path and the determined delay time of the path determined by the static timing analyzer. A positive value for the slack indicates that the circuit design does not have a timing violation, and a negative value for the slack indicates that the circuit design has a timing violation.

Figure 3:
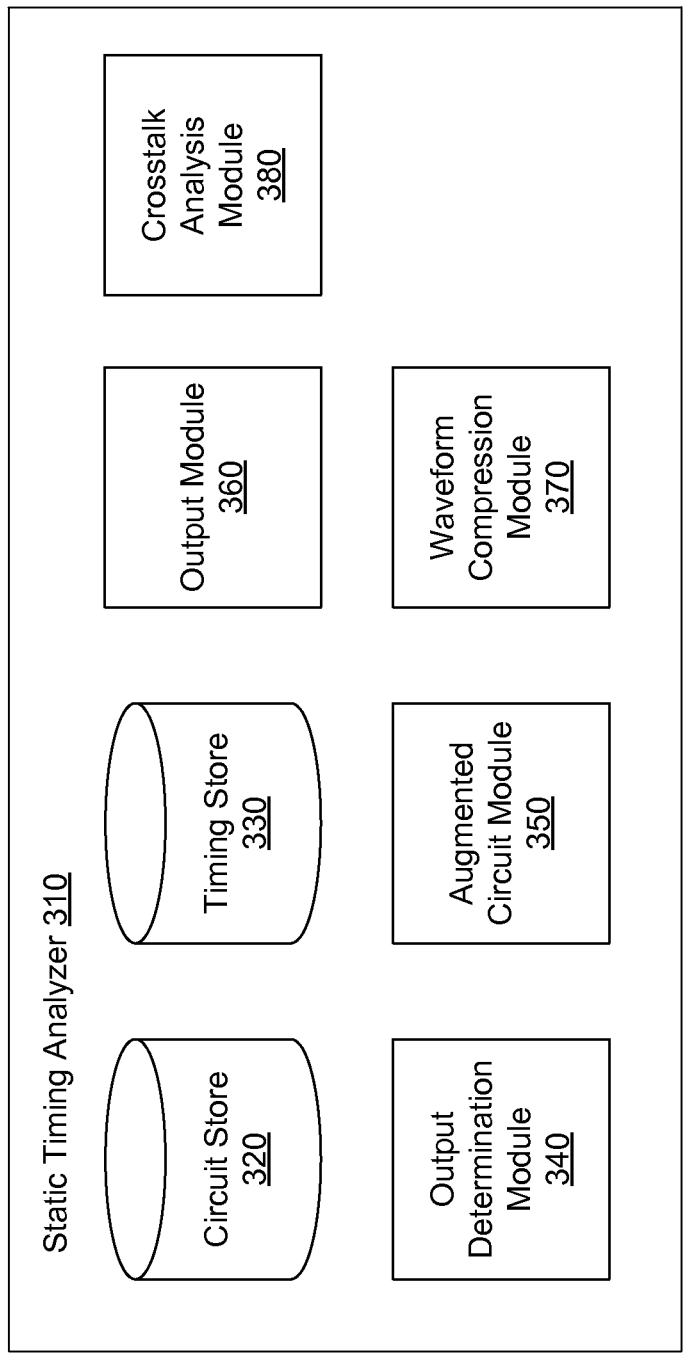
FIG. 3 illustrates a system architecture diagram showing various modules of a static timing analyzer, according to one embodiment.

FIG. 3 is a system architecture diagram showing various modules of a static timing analyzer, according to one embodiment. The static timing analyzer 310 comprises modules including a circuit store 320, a timing store 330, an output determination module 340, an augmented circuit module 350, an output module 360, a waveform compression module 370, and a crosstalk analysis module 380. In other embodiments, the static timing analysis system 310 may include additional, fewer, or different modules for various applications. Conventional components such as network interfaces, security mechanisms, load balancers, failover servers, management and network operations consoles, and the like are not shown so as to not obscure the details of the system.

The circuit store 320 stores a description of the circuit being analyzed including a netlist, various constraints, and so on. In an embodiment, the circuit store 320 may represent the circuit using a graph representation in which the nodes correspond to various components of the circuit and the edges correspond to the connections between the circuits. The output module 360 sends information describing the timing violations, the priorities of timing violations, and reasons associated with timing violations for presentation to a user.

To increase the speed of a static timing analysis, static timing analyzer 310 uses a set of predetermined timing responses stored in the timing store 330. The timing store 330 stores a pre-computed timing response for cells used in an integrated circuit for various input waveforms.

The static timing analyzer 310 identifies input waveforms used to pre-compute the timing response of cells by a transition time. As used herein, a transition time is the amount of time that takes a waveform to transition from a lower transition trip-point, 30% of the supply voltage level (0.3 VDD), to an upper transition trip-point, 70% of the supply voltage level (0.7 VDD), or the amount of time that takes a waveform to transition from 70% of the supply voltage level (0.7 VDD) to 30% of the supply voltage level (0.3 VDD). The lower and upper transition trip-points may have other values as long as the upper transition trip-point is larger than the lower transition trip-point.

Given an input waveform, the output determination module 340 determines the delay of a cell by querying or looking up timing store 330 with information identifying the input waveform. The output determination module 340 receives a delay value from the timing store 330 based on the information identifying the input waveform. For instance, the output determination module 340 receives a delay value from the timing store 330 based on the transition time of the input waveform.

The timing store 330 may only store delay values for one waveform (a nominal waveform) for each transition time. The actual waveforms that would be inputted to cells of an integrated circuit may deviate from the nominal waveforms used to determine the delay values of those cells. Since the actual waveforms that are inputted to cells of the integrated circuit may deviate from the nominal waveform in many different ways, storing the output produced by the cell for every possible waveform deviation may not be feasible.

The augmented circuit module 350 constructs an augmented circuit for determining the output of a cell for a distorted waveform. The augmented circuit module 350 generates an augmented circuit model based on the circuit model of the cell and an ideal waveform corresponding to the distorted waveform.

The waveform compression module 360 compresses timing waveforms for a circuit for storing the data efficiently. The waveform compression module 360 stores a difference waveform determined as the difference between the actual waveform and a nominal waveform. The waveform compression module 360 stores the difference waveform since the difference waveform has smaller dynamic range compared to the actual waveform, therefore can be compressed at higher ratio. The waveform compression module 360 may perform down-sampling and bit-compaction.

The crosstalk analysis module 380 determines a waveform that can be used for conservative timing analysis of a circuit while accounting for crosstalk in the circuit. The crosstalk analysis module 380 determines a time-shifted waveform corresponding to an input uncoupled waveform that is used to the timing analysis of the circuit. The crosstalk analysis module 380 determines a time delay value based on the input monotonic uncoupled (based on assuming no crosstalk) and an input coupled waveform (assuming crosstalk).

Figure 4A:
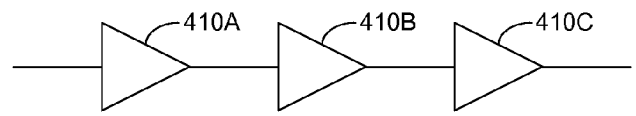
FIG. 4A illustrates an exemplary circuit diagram for performing a static timing analysis, according to one embodiment.

FIG. 4A illustrates an exemplary circuit diagram for performing a static timing analysis. The circuit diagram of FIG. 4A includes cells 410A, 410B and 410C. The static timing analyzer 310 may determine the delay of cell 410B when cell 410B has cell 410C as a load and receives as an input, the output of cell 410A.

Figure 4B:
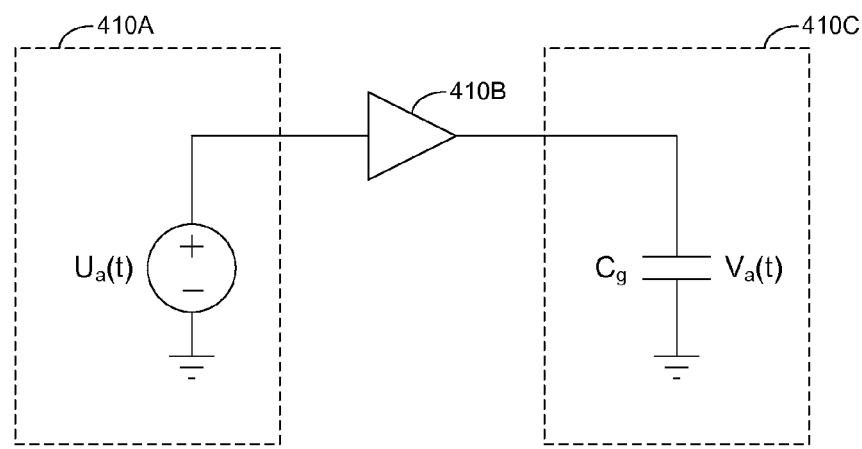
FIG. 4B illustrates a circuit model for analyzing the delay of a cell of the circuit diagram of FIG. 4A, according to one embodiment.

FIG. 4B illustrates a circuit model for analyzing the delay of cell 410B of FIG. 4A. Cell 410A is modeled as a voltage source with a time dependent voltage waveform $U_a(t)$. Cell 410C is modeled as a capacitor $C_g$. $C_g$ may be a constant value, or may change based on the output voltage range. Output cell 410B may be connected to the input of cell 410C through an interconnect with parasitic resistance and parasitic capacitance.

Figure 5:
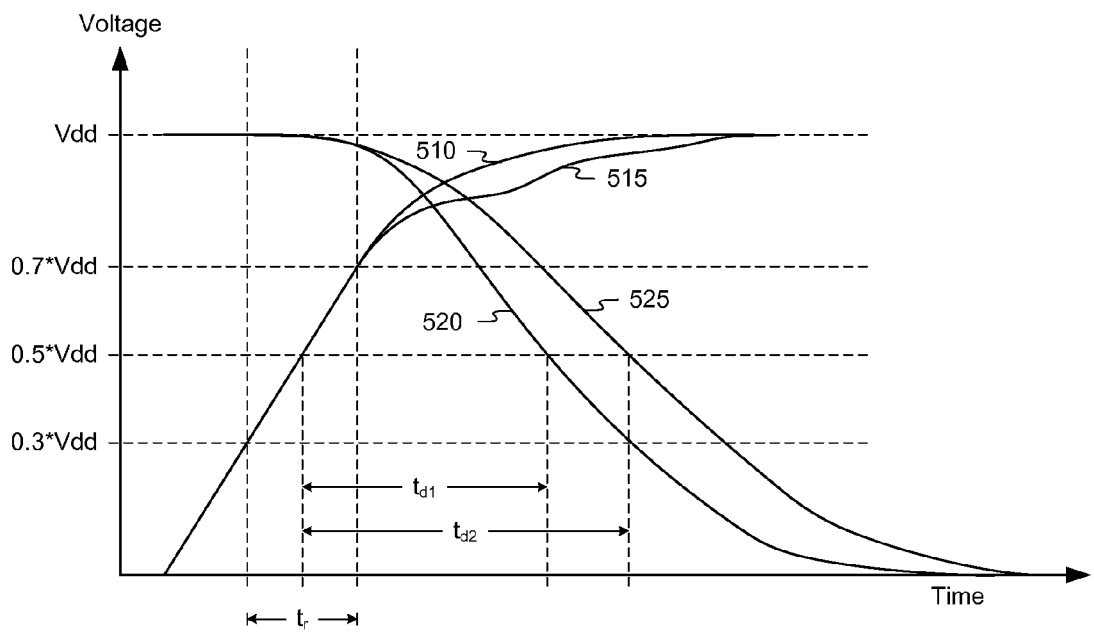
FIG. 5 illustrates a nominal input waveform, a distorted input waveform that has the same transition time as the nominal waveform, a nominal output waveform of a cell having as an input the nominal input waveform, and a distorted output waveform of the cell having as an input the distorted input waveform, according to one embodiment.

FIG. 5 illustrates an exemplary nominal waveform 510 and an exemplary distorted waveform 515 that has the same transition time as nominal waveform 510. FIG. 5 also illustrates a nominal output 520 of a cell having as an input nominal waveform 510 and a distorted output 525 of the cell having an input distorted waveform 515. As illustrated in FIG. 5, input waveforms 510 and 515 have the same transition time. That is, nominal input waveform 510 and distorted input waveform 515 transitions from 0.3*VDD to 0.7*VDD in the same amount of time ($t_r$). Even though input waveforms 510 and 515 have the same transition time, the nominal output waveform 520 of nominal input waveform 510 and the distorted output waveform 525 of distorted input waveform 515 have different delay times. As illustrated in FIG. 5, the delay time ($t_{d1}$) of nominal output waveform 520 is smaller than the delay time ($t_{d2}$) of distorted output waveform 525. Additionally, output waveform 520 and distorted output waveform 525 may have different transition times as well.

Thus, if during a static timing analysis, the delay $t_{d1}$ due to nominal input waveform 510 is used instead of the delay $t_{d2}$ due to distorted input waveform, the results of the static timing analysis will be inaccurate.

Figure 6:
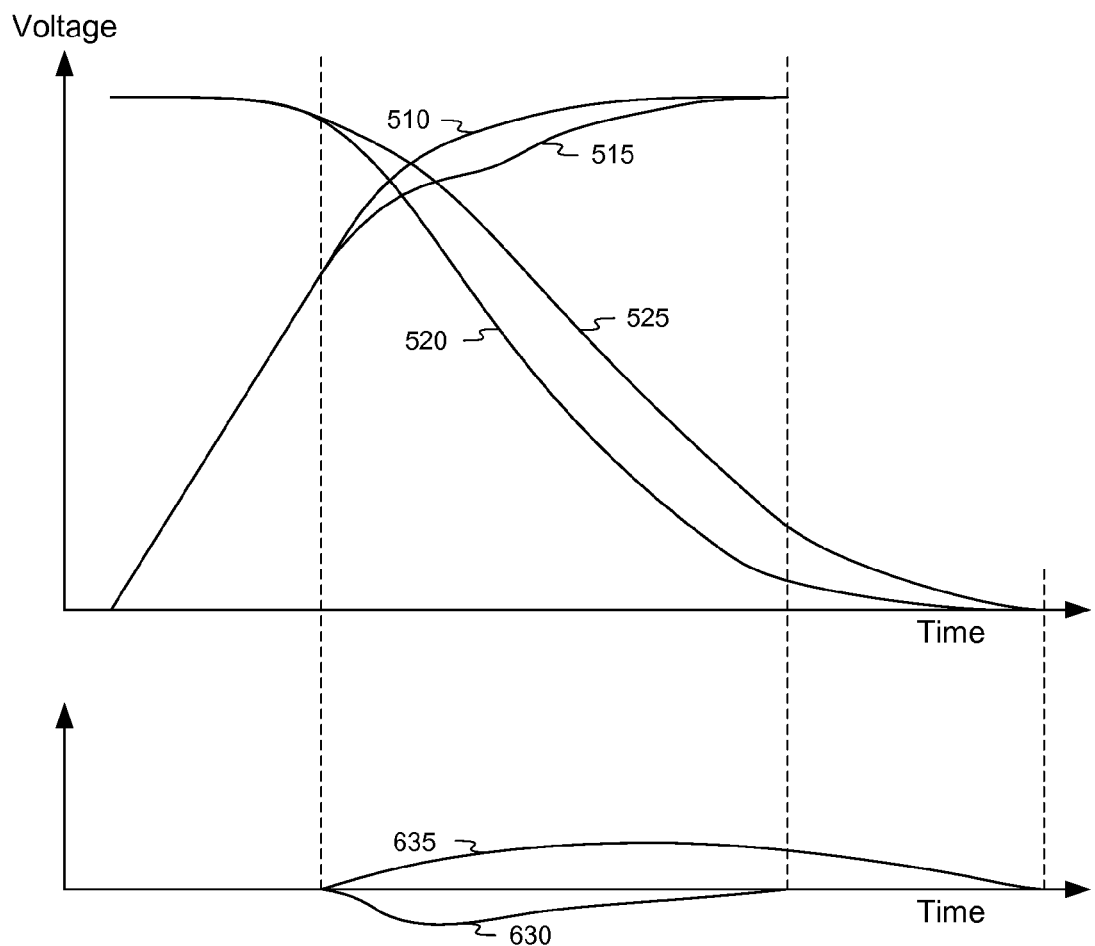
FIG. 6 illustrates a timing signal graph with a difference input waveform for performing an analysis with a distorted input waveform, and an difference output waveform obtained after the performing the analysis with the distorted input waveform, according to one embodiment.

FIG. 6 illustrates a distortion input waveform and a distortion output waveform. The distortion input waveform 630 is the voltage difference between the distorted input waveform 515 and the nominal input waveform 510. The distortion output waveform 625 is the voltage difference between the distorted output waveform 525 and the nominal output waveform 520.

Figure 7A:
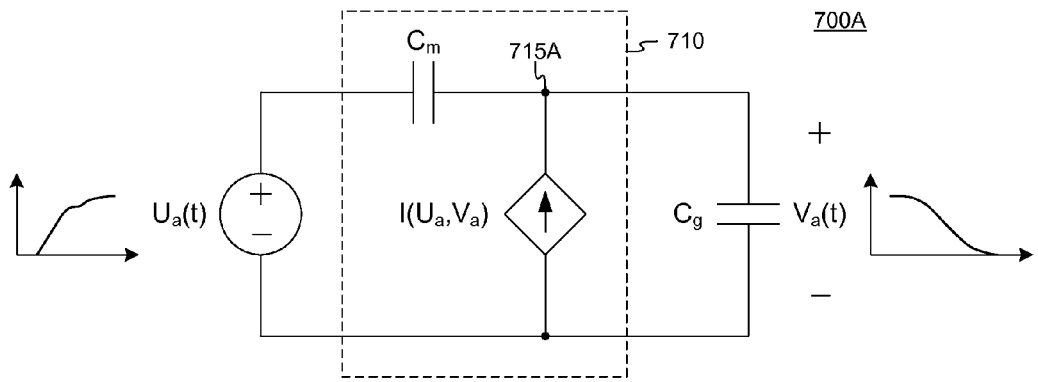
FIG. 7A illustrates a circuit diagram for modeling a cell with a distorted input waveform, according to one embodiment.

FIG. 7A illustrates a circuit model for simulating a cell, according to one embodiment. Circuit diagram 700A includes voltage source $U_a(t)$ that provides an input waveform 515 to cell 710 and capacitor $C_g$ that provides a load to cell 710. The circuit model for cell 710 includes capacitor $C_m$ and voltage dependent current source $I(U_a, V_a)$. Applying Kirchhoff's current law (KCL) at node 715A of circuit 700A the following equation is obtained:

$$C_m \frac{d}{dt}(U_a(t) - V_a(t)) + I(U_a, V_a) = C_g \frac{d}{dt} V_a(t) \quad (1)$$

Figure 7B:
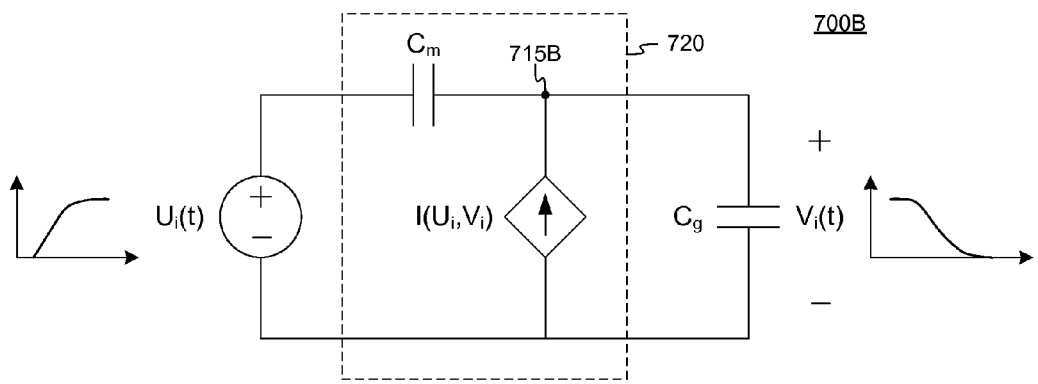
FIG. 7B illustrates a circuit diagram for modeling a cell with an ideal input waveform, according to one embodiment.

FIG. 7B illustrates a circuit model for simulating a cell with a nominal input waveform 510, according to one embodiment. Circuit diagram 700B includes voltage source $U_i(t)$ that provides a nominal input waveform 510 with the same transition time as the input waveform $U_a(t)$ of circuit model 700A of FIG. 7A, and capacitor $C_g$. The circuit model for cell 720 includes capacitor $C_m$ and voltage dependent current source $I(U_i, V_i)$. Applying Kirchhoff's current law (KCL) at node 715B of circuit 700B the following is obtained:

$$C_m \frac{d}{dt}(U_i(t) - V_i(t)) + I(U_i, V_i) = C_g \frac{d}{dt} V_i(t) \quad (2)$$

Subtracting equation (2) from equation (1) the following is equation (3) obtained:

$$C_m \frac{d}{dt}((U_a(t) - U_i(t)) - (V_a(t) - V_i(t))) + I(U_a, V_a) = \quad (3)$$
$$C_g \frac{d}{dt}(V_a(t) - V_i(t)) + I(U_i, V_i)$$

Replacing $(U_a(t)-U_i(t))$ by $U_n(t)$ and $(V_a(t)-V_i(t))$ by $V_n(t)$ the following equation (4) is obtained:

$$C_m \frac{d}{dt}(U_n(t) - V_n(t)) + \hat{I}(U_n, V_n) = C_g \frac{d}{dt}(V_n(t)) + I(U_i, V_i) \quad (4)$$

Where $\hat{I}(U_n, V_n)$ is equal to $I(U_i-U_n, V_i-V_n)$. Thus, an augmented circuit that is represented by equation (4) can be constructed to determine the distortion of an output waveform $V_n(t)$ due to a distortion in an input waveform $U_n(t)$.

Figure 7C:
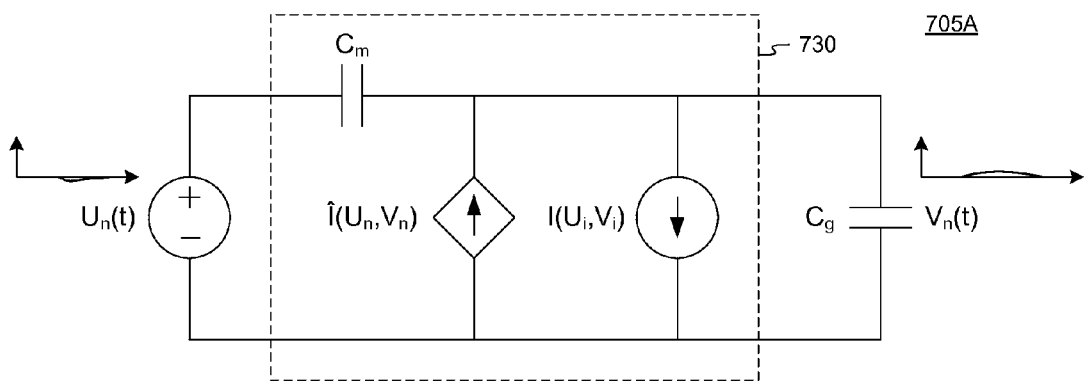
FIG. 7C illustrates a circuit diagram for determining the effect of the distortion of the distorted input waveform on the output waveform, according to one embodiment.

FIG. 7C illustrates an augmented circuit diagram for determining the distortion in an output waveform due to a distortion in an input waveform. Circuit diagram 705A includes voltage source $U_n(t)$ that provides a distortion input waveform 630, and capacitor $C_g$. The circuit model further includes capacitor $C_m$, voltage dependent current source $\hat{I}(U_n, V_n)$, and current source $I(U_i, V_i)$. Since $I(U_i, V_i)$ is only dependent on nominal values, the value of $I(U_i, V_i)$ can be pre-computed and stored in timing store 330.

The differential equation (4) can be solved to determine the distortion in the output waveform of a cell due to a distortion in the input waveform. Since the distortion waveforms are small compared to the nominal waveforms, equation (4) and/or circuit 705A can be solved using a larger margin of error or tolerance. For instance, equation (4) and/or circuit 705A can be solved using a 10% margin of error. As a result, the computation of the distortion in the output can be done faster and using less computational resources than having to perform the computation of the distorted output waveform by solving equation (1) and/or circuit 700A.

Figure 7D:
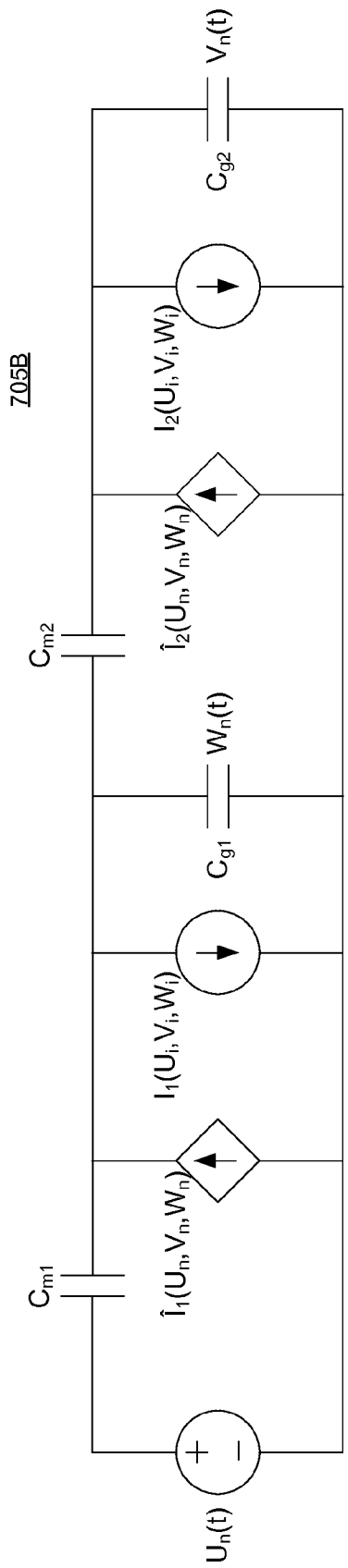
FIG. 7D illustrates a circuit diagram for determining the effect of the distortion of the distorted input waveform on the output waveform for a cell with two channel-connected blocks (CCBs), according to one embodiment.

FIG. 7D is an augmented circuit for a cell with two channel-connected blocks. For instance, the augmented circuit of FIG. 7D can be used to analyze cells such as buffers, NAND gates, NOR gates, etc. Augmented circuit diagram 705B includes voltage source $U_n(t)$ that provides a distortion input waveform 630, capacitors $C_{m1}$, $C_{m2}$, $C_{g1}$, and $C_{g2}$, voltage dependent current sources $\hat{I}_1(U_n, V_n, W_n)$, and $\hat{I}_2(U_n, V_n, W_n)$, and augmented current sources $I_1(U_i, V_i, W_i)$, and $I_2(U_i, V_i, W_i)$.

Figure 8:
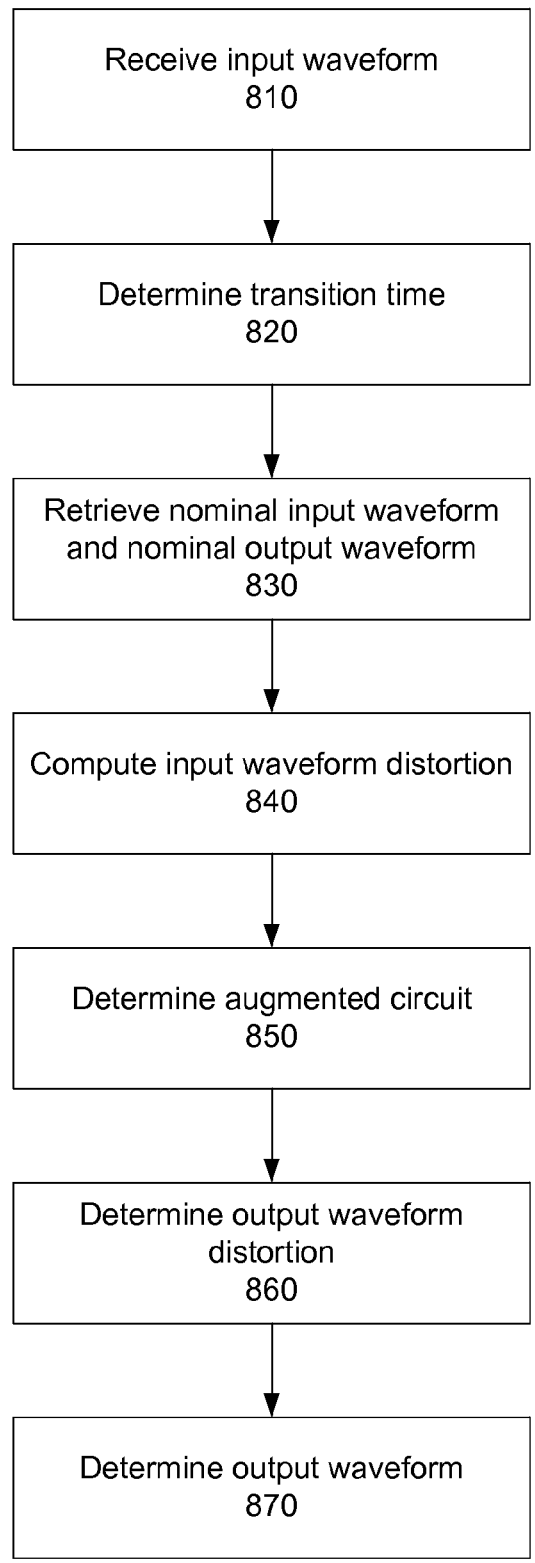
FIG. 8 is a flow diagram illustrating a process for determining an output waveform of a cell with a distorted input waveform, according to one embodiment.

FIG. 8 is a flow diagram illustrating a process for determining an output waveform of a cell with a distorted input waveform. The static timing analyzer 310 receives 810 an input waveform 515. The input waveform 515 may be an output waveform from a previous cell of an integrated circuit. The static timing analyzer 310 determines 820 a transition time $t_r$ for the input waveform. The static timing analyzer 310 determines 820 the transition time as the time that takes for the input waveform to transition from 30% of the supply voltage level (0.3*VDD) to 70% of the supply voltage level (0.7*VDD) if the input waveform is transitioning from a LOW state to a HIGH state, or the time that takes the input waveform to transition from 70% of the supply voltage level (0.7*VDD) to 30% of the supply voltage level (0.3*VDD) if the input waveform is transitioning from a HIGH state to a LOW state.

Based on the determined transition time $t_r$, the static timing analyzer 310 retrieves 830 nominal input waveforms and pre-computed nominal output waveforms from timing store 330. The static timing analyzer 310 computes 840, the input waveform distortion 630. The input waveform distortion 630 is determined as the difference between the input waveform 515 and the nominal input waveform 510 with the same transition time as the input waveform 515.

The augmented circuit module 350 determines 850 an augmented circuit 705A. The augmented circuit module 350 obtains components of the augmented circuit 705A from the timing store 330. For instance, the augmented circuit module 350 may obtain the current source of the augmented circuit that is only dependent on nominal waveforms from the timing store 330.

Using the augmented circuit 705A, the output determination module 340 determines 860 the output waveform distortion 635. The output determination module 340 may solve the augmented circuit 705A using a relaxed margin of error or a coarse time step. The output determination module 340 determines 870 the output waveform 525 based on the determined output waveform distortion 635. The output waveform is the combination of the nominal output waveform 520 and the output waveform distortion 635. After determining the output waveform 525, the output determination module 340 can determine the cell delay from the determined output waveform 525 and the input waveform 515. For instance, the cell delay may be determined as the amount of time between the input waveform having a voltage level equal to 50% of the supply voltage level (0.5*VDD) until the output waveform 525 has a voltage level equal to 50% of the supply voltage level (0.5*VDD).

Waveform Compaction

Embodiments of disclosed system, method and computer readable storage medium efficiently store a representation of a distorted waveform comprising. A coupled non-monotonic input waveform is received. Information describing a distorted waveform is received. A transition time of the distorted waveform is determined. Information describing a nominal waveform based on the determined transition time is determined. For a plurality of predetermined voltage levels, the difference between the distorted waveform and the nominal waveform is computed. The difference between the distorted waveform and the nominal waveform is stored. If a request for values of the waveform is received, the request values are determined using the nominal waveform and the stored difference between the distorted waveform.

Figure 9:
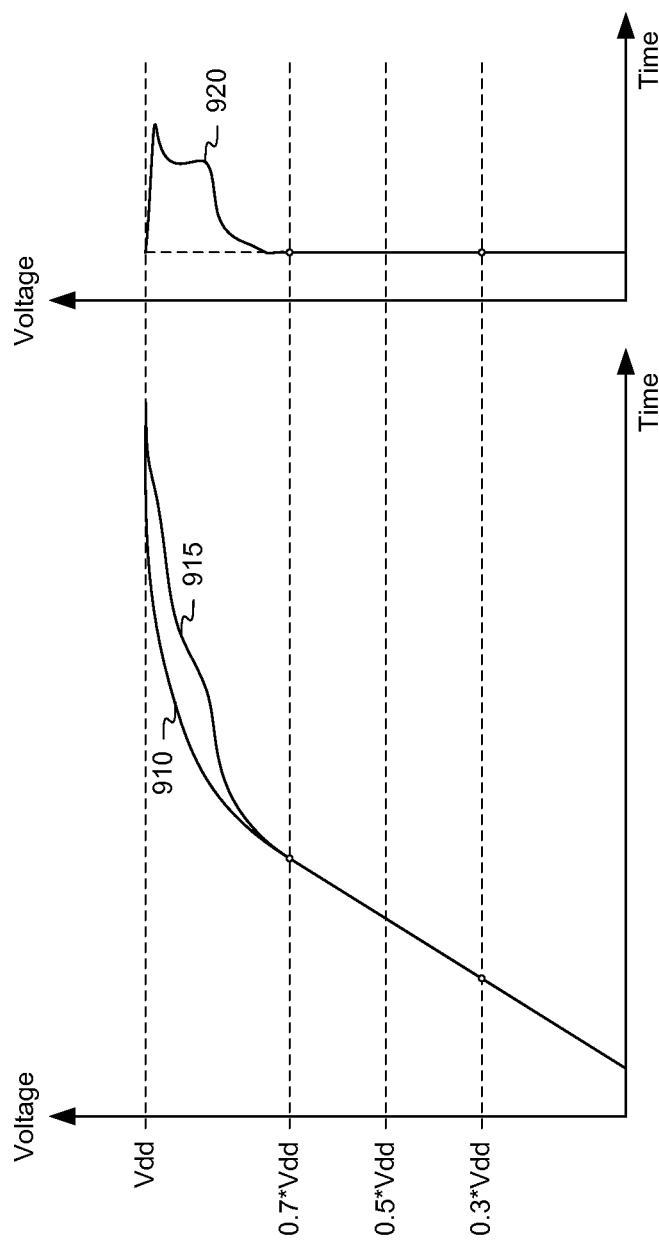
FIG. 9 illustrates a plot for compacting the representation of waveforms, according to one embodiment.

FIG. 9 illustrates a plot for compacting the representation of waveforms, according to one embodiment. The plot of FIG. 9 includes a time distorted waveform 915 ($f_{distorted}$) and a nominal waveform 910 ($f_{nominal}$) that has the same transition time as the distorted waveform 915. The plot of FIG. 9 further includes a difference waveform 920 that captures the difference between distorted waveform 915 and nominal waveform 910. The difference waveform 920 is the difference of the time as a function of voltage $$f_{nominal}(V) - f_{distorted}(V) \quad (5)$$

In some embodiments, waveforms 910 and 915 are sampled at pre-determined voltage values. Waveforms 910 and 915 may be sampled at 25 predefined voltage values. In some embodiments, the density of the predefined voltage values for sampling the waveforms 910 and 915 is not uniform. For instance, the density of the sampling voltage values may be higher near the tail of the waveforms. That is, the density of the sampling voltage values may be higher near VDD for waveforms transitioning from 0V to VDD, and the density of the sampling voltage values may be higher near 0V for a waveform transitioning from VDD to 0V.

Figure 10:
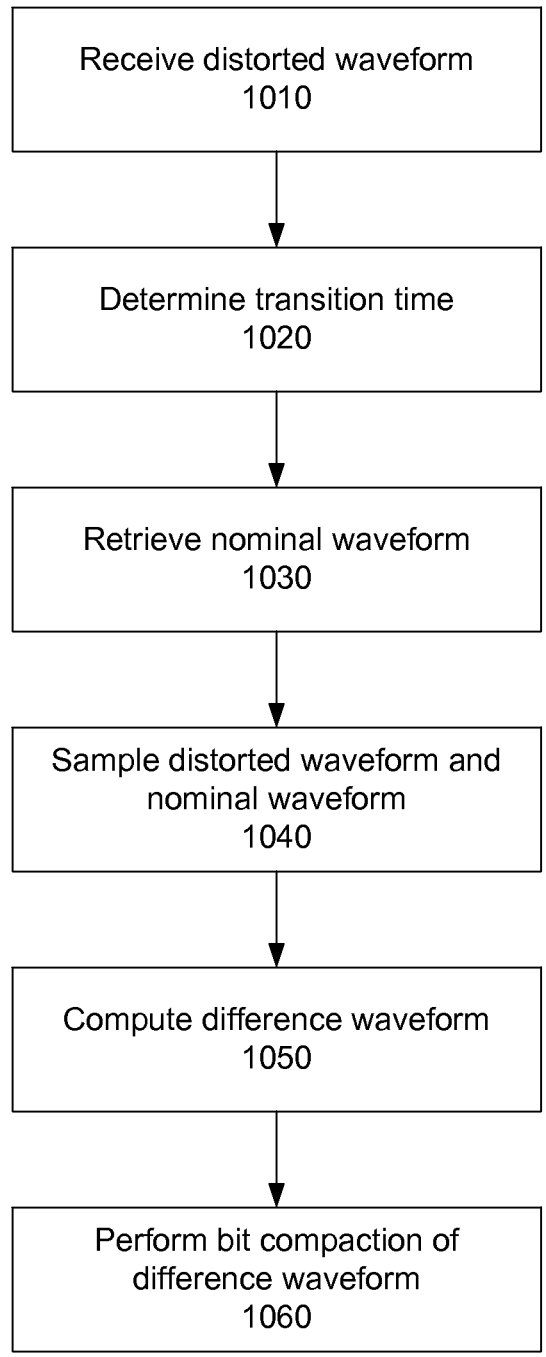
FIG. 10 illustrates a flow diagram of a process for compressing the representation of a distorted waveform, according to one embodiment.

FIG. 10 illustrates a flow diagram of a process for compressing the representation of a distorted waveform, according to one embodiment. The static timing analyzer 310 receives 1010 a distorted waveform 915 and determines 1020 the transition time of the distorted waveform 915. The static timing analyzer 310 retrieves 1030 a nominal waveform 910 that has the same transition time as the distorted waveform.

The waveform compression module 370 samples the distorted waveform 915 and the nominal waveform 910 at a plurality of predetermined voltage levels and computes the difference waveform 920. For instance, the difference waveform may be determined as:

$$f_{difference}(V_i) = f_{nominal}(V_i) - f_{distorted}(V_i), i = 0, \ldots, n \quad (6)$$

Where $V_i$ are the voltage levels used to sample the distorted waveform 915 and the nominal waveform 910. Since the voltage level for transitioning waveforms changes from 0V to VDD or VDD to 0V, the sampling voltage levels can be predetermined. Alternatively, if the waveforms are sampled as a function of time, the sampling time values cannot be predetermined since each waveform may take a different amount of time to switch. As such, storage space can be reduced by sampling the waveforms at predetermined voltage levels, since the voltage levels used to sample the waveforms do not need to be stored together with the time values.

The waveform compression module 370 compacts 1060 the representation of the time values of the difference waveform. Storing the difference between the nominal waveform 910 and the distorted waveform 915 beneficially allows for compaction of the representation of values of the waveform. The range of values used to represent the difference waveform 920 is smaller than the range of values used to represent the distorted waveform 915. In addition, the waveform compression module 370 normalizes the values used to represent the difference waveform 920 to a specific value. For instance, the waveform compression module 370 may normalize the values used to represent the difference waveform 920 to the maximum value of the difference waveform 920. As such, instead of storing floating point values, fixed point values may be used to represent the difference waveform 920.

Coupled Static Timing Analysis

Embodiments of disclosed system, method and computer readable storage medium perform coupled static timing analysis of a cell that includes a plurality of channel connected blocks. An uncoupled waveform is reused to compute crosstalk delay by using a time-shifted uncoupled waveform that bounds the coupled waveform. The waveform bounding guarantees conservatism for static timing analysis. Reuse of the uncoupled waveform allows faster runtime execution of the timing analysis. Furthermore, representing the coupled non-monotonic waveform requires more storage than the time-shifted uncoupled waveform determined by the embodiments. Also, compressing the coupled non-monotonic waveform is more complicated than compressing the time-shifted uncoupled waveform.

Figure 11:
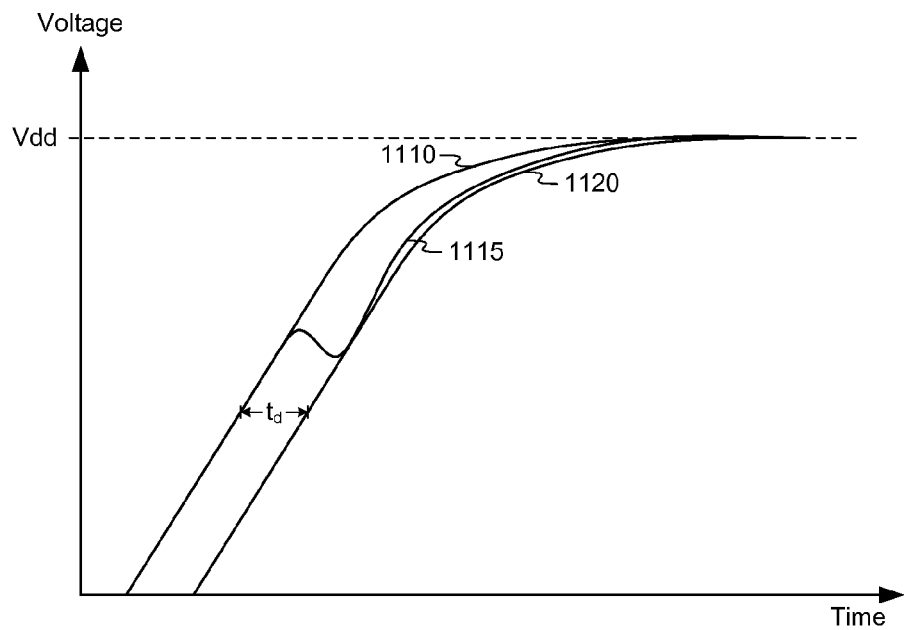
FIG. 11 illustrates a coupled non-monotonic waveform bounded by two uncoupled waveforms, according to one embodiment.

FIG. 11 illustrates a non-monotonic waveform bounded by two monotonic waveforms, according to one embodiment. During operation of an integrated circuit, due to crosstalk between a cell and adjacent cells, a waveform produced by the cell may include non-monotonic trend. For instance, a waveform that transitions from 0V to VDD may momentarily decrease as the waveform is transitioning due to crosstalk caused by a signal from an adjacent cell transitioning in the opposite direction.

Figure 12:
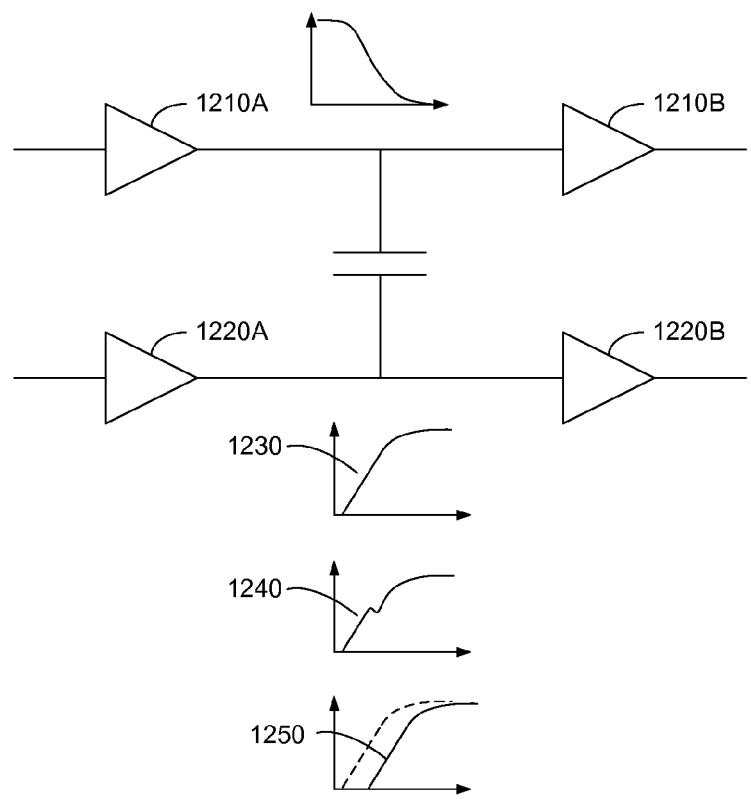
FIG. 12 illustrates a circuit diagram for analyzing a coupled response of a cell, according to one embodiment.

FIG. 12 illustrates a circuit diagram for analyzing a coupled response of a cell, according to one embodiment. The circuit diagram of FIG. 12 includes aggressor cells 1210 and victim cells 1220. Aggressor cells 1210 are capacitively coupled to the victim cells 1220 and affect the waveforms produced and/or received by victim cells 1220. For instance, if the output waveform of aggressor cell 121 OA is switching in the opposite direction as the output waveform of victim cell 1220, the output waveform of victim cell 1220 may experience a non-monotonic glitch or distortion.

As illustrated in FIG. 11, coupled non-monotonic waveform 1115 is bounded by the uncoupled waveform 1110 delayed by $t_d$ (hereinafter referred to as delayed uncoupled waveform 1120). The response of a cell for the coupled non-monotonic waveform 1115 would be bounded by the delayed uncoupled waveform 1120. That is, the delay in the output of a cell for the coupled non-monotonic waveform 1115 is larger or equal to the delayed uncoupled waveform 1120.

Figure 13:
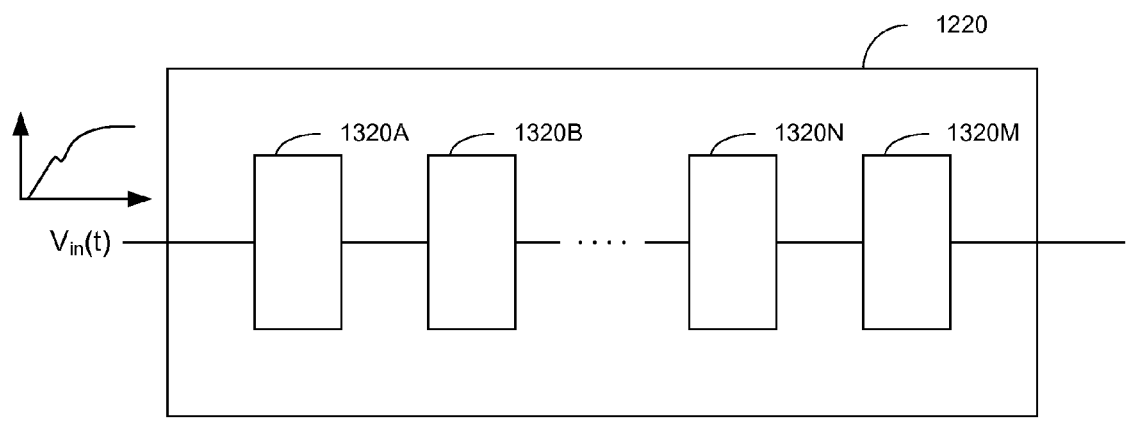
FIG. 13 illustrates a cell for performing a coupled static timing analysis, according to one embodiment.

FIG. 13 illustrates a cell for performing a coupled static timing analysis, according to one embodiment. Cell 1220 includes multiple channel connected blocks (CCBs) 1320. For large designs, performing a circuit simulation of cell 1220 can be time consuming. To increase the speed of the timing analysis, instead of finding the output of the cell due to a coupled non-monotonic input waveform directly, a bounding waveform may be determined by using a time-shifted uncoupled input waveform instead of the coupled non-monotonic input waveform. The uncoupled input waveform is time shifted by an amount that guarantees conservatism in the static timing analysis.

For instance, assuming uncoupled output waveform 1230 is obtained without considering the effect of crosstalk on the output of cell 1220, a delayed version of the uncoupled waveform 1230 can be used to bound the output waveform of the cell 1220 due to the coupled non-monotonic waveform 1240 caused by the crosstalk with the cell 1210. Thus, to determine the waveform that bounds the output waveform, an uncoupled waveform corresponding to the coupled non-monotonic output waveform 1240 is determined. A time delay ($t_d$) of the delayed version of the uncoupled waveform 1230 that bounds the coupled non-monotonic output waveform is determined. The delayed version 1250 of the uncoupled output waveform 1230 is used for performing the timing analysis of cell 1220B. The coupled output waveform 1240 of the cell 1220A is bounded by the delayed version of the uncoupled output waveform 1250 at the output of the cell 1220A, where the delayed version of the output is delayed by $t_d$. The delayed version of the uncoupled output waveform 1250 is used as the input to cell 1220B.

In an embodiment, the time delay $t_d$ is determined using the uncoupled output waveform (obtained by assuming no crosstalk from other cells) and the coupled non-monotonic output waveform (obtained by assuming crosstalk with other cells). In an embodiment, the time difference value between two waveforms is determined for different voltage values. The maximum of the time difference values is used as the time delay $t_d$. Accordingly, the output waveform is shifted by the time delay value $t_d$ and the time-shifted waveform used for analysis of the receiver cell.

In some embodiments, a tighter bound for the waveform may be obtained by estimating a smaller time delay $t_d$ value. In these embodiments, the output of a first subset of CCBs 1320 based on the coupled non-monotonic input waveform is determined by performing an accurate analysis, for example, circuit simulation. Assume that the output of the first subset of CCBs 1320 results in a first coupled non-monotonic output waveform. Furthermore, a second output waveform of the first subset of CCBs 1320 is obtained by providing the uncoupled waveform as input to the first subset of CCBs 1320. The time delay $t_d$ value at the input is determined using the first output waveform and the second output waveform. For example, the time difference values are determined between the first output waveform and the second output waveform for a plurality of voltage values. The maximum of the time difference value is used as the time delay $t_d$.

Figure 14:
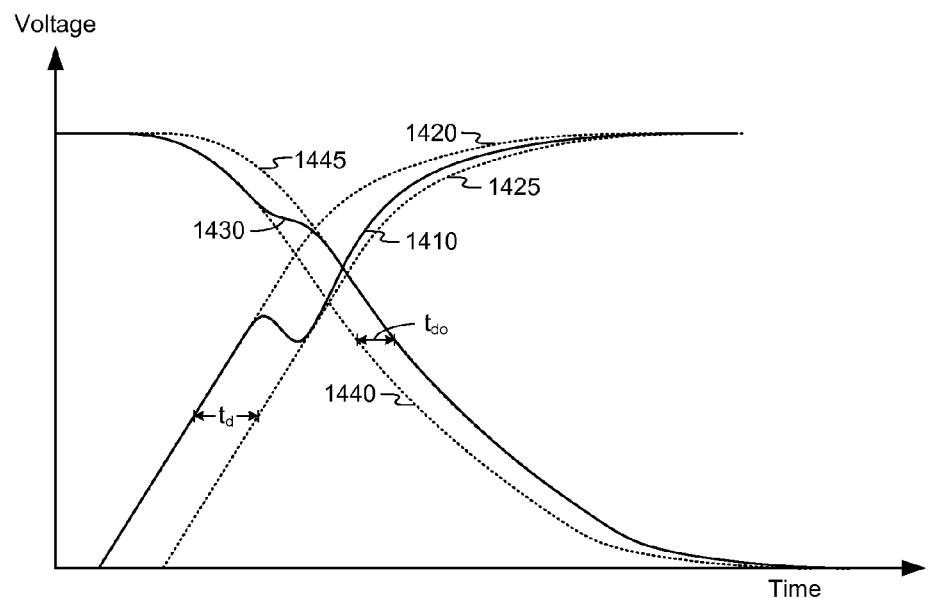
FIG. 14 illustrates an output waveform of a first subset of CCBs for a coupled non-monotonic input waveform, according to one embodiment.

FIG. 14 illustrates an output waveform of a first subset of CCBs for a coupled non-monotonic input waveform, according to one embodiment. FIG. 14 includes a coupled non-monotonic input waveform 1410 and an uncoupled input waveform 1420 associated with the coupled non-monotonic input waveform 1410. The figure further includes a coupled output waveform 1430 that corresponds to the output of a first subset of CCBs of a cell that has as an input the coupled non-monotonic input waveform 1410 and a uncoupled output waveform 1440 that corresponds to the output of the first subset of CCBs of a cell that has as an input the uncoupled input waveform 1420. The coupled output waveform 1430 can then be bounded by the delayed version of the uncoupled output waveform (hereinafter referred to as delayed non-coupled output waveform 1445).

Figure 15:
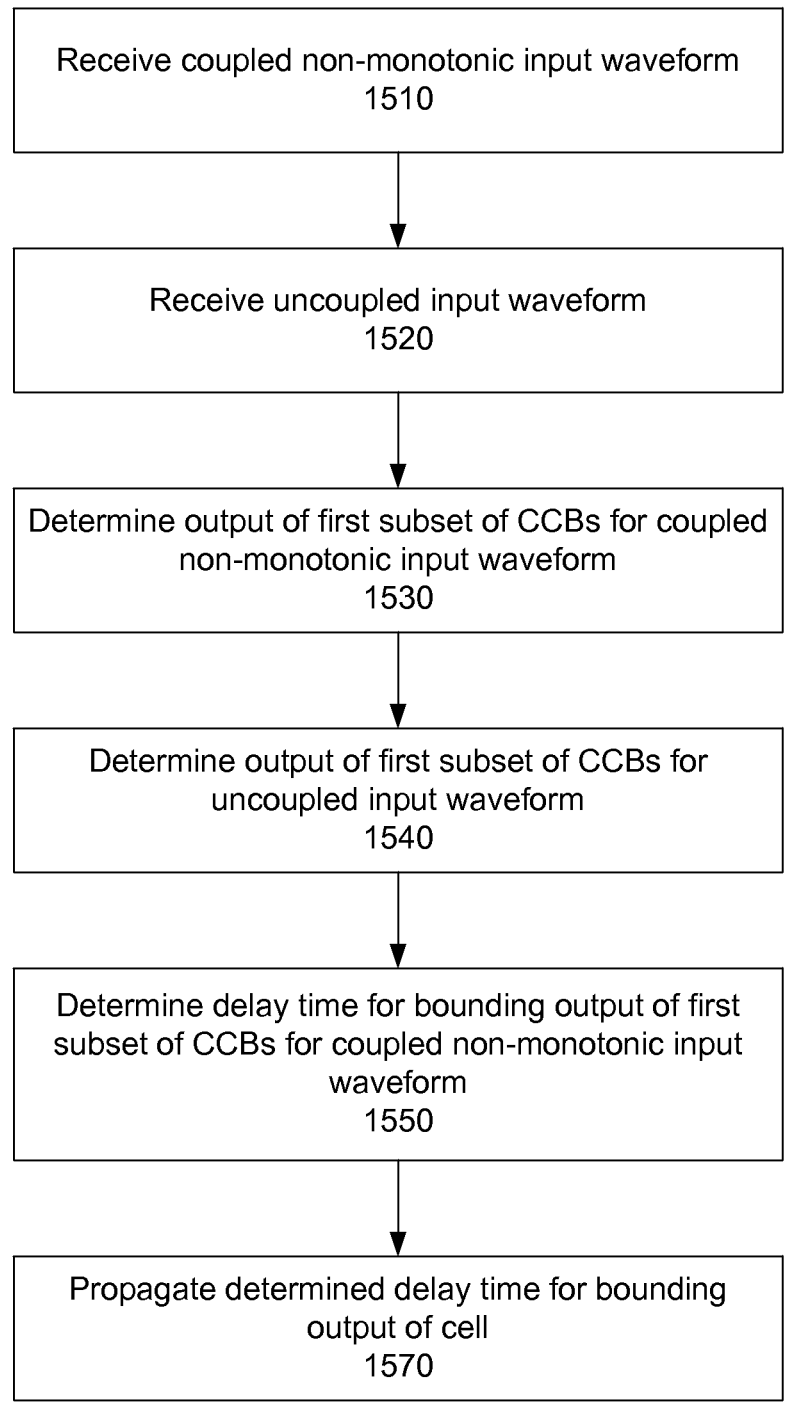
FIG. 15 illustrates a flow diagram for performing a coupled static timing analysis, according to one embodiment.

FIG. 15 illustrates a flow diagram for performing a coupled static timing analysis, according to one embodiment. The static timing analyzer 310 receives 1510 a coupled non-monotonic input waveform 1410 computed considering crosstalk. The static timing analyzer 310 receives 1520 an uncoupled input waveform 1420 computed without considering crosstalk. The crosstalk analysis module 380 determines 1530 an output of a first subset of CCBs 1320 for the coupled non-monotonic input waveform 1410. The output of the first subset of CCBs 1320 for the coupled non-monotonic input waveform 1410 may, for example, be determined by simulating a circuit model of the CCBs 1320 having as an input the coupled non-monotonic input waveform 1410.

The crosstalk analysis module 380 determines 1540 output of the first subset of CCBs 1320 for the uncoupled input waveform 1420. The output of the first subset of CCBs 1320 for the uncoupled input waveform 1420 may, for example, be determined by using the method described in FIG. 8. Alternatively, the output of the first subset of CCBs 1320 may be determined by simulating a circuit model of the CCBs 1320 having as an input the uncoupled input waveform 1410.

The crosstalk analysis module 380 determines 1550 a time delay ($t_d$) that bounds the output waveform 1430 of the first subset of CCBs 1320 for the coupled non-monotonic input waveform, by the delayed output waveform 1445 of the first subset of CCBs 1320 for the uncoupled input waveform.

The time delay ($t_d$) is propagated 1570 to bound the output of the cell 1220. For example, the time delay ($t_d$) is used to time-shift the input uncoupled waveform and the analysis performed using the time-shifted uncoupled waveform.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable storage medium storing instructions for performing static timing analysis of an integrated circuit design for manufacturing, the instructions for:
   receiving, by a static timing analyzer, information describing a distorted input waveform, the distorted input waveform received as input to a cell of the integrated circuit design for performing timing analysis of the integrated circuit design, the integrated circuit design for manufacturing;
   determining, by the static timing analyzer, a transition time of the distorted input waveform;
   receiving, by the static timing analyzer, information describing a nominal input waveform based on the determined transition time and a corresponding nominal output waveform, the nominal output waveform representing output of the cell of the integrated circuit design;
   computing, by the static timing analyzer, an input waveform distortion as a difference between the distorted input waveform and the nominal input waveform;
   generating, by the static timing analyzer, an augmented circuit based on the nominal input waveform and the input waveform distortion; and
   computing an output waveform distortion for the output of the cell of the integrated circuit design based on the augmented circuit.

2. The non-transitory computer readable storage medium of claim 1, wherein the input waveform distortion is the difference between the distorted input waveform and the nominal input waveform.

3. The non-transitory computer readable storage medium of claim 1, wherein a transition time of the nominal input waveform is equal to the transition time of the distorted input waveform.

4. The non-transitory computer readable storage medium of claim 1, wherein the elements of the augmented circuit are extracted from a library.

5. The non-transitory computer readable storage medium of claim 4, wherein the augmented circuit comprises:
   a voltage source, the voltage source having a waveform equal to the input waveform distortion;
   a first capacitor coupled to the voltage source;
   a first current source coupled to the first capacitor;
   a second current source, the second current source in parallel with the first current source, the second current source dependent on the nominal input waveform; and
   a second capacitor, the second capacitor in parallel with the second current source.

6. The non-transitory computer readable storage medium of claim 5, wherein the output waveform distortion is a voltage waveform across the second capacitor.

7. The non-transitory computer readable storage medium of claim 4, wherein the output waveform distortion is computed using a margin of error exceeding a threshold value.

8. The non-transitory computer readable storage medium of claim 1 further storing instructions for:
   determining a distorted output waveform based on the nominal output waveform and the computed output waveform distortion.

9. The non-transitory computer readable storage medium of claim 8, wherein determining the distorted output waveform comprises:
   determining the distorted output waveform by adding the nominal output waveform and the output waveform distortion.

10. The non-transitory computer readable storage medium of claim 8, further storing instructions for:
    determining a cell delay based on the distorted input waveform and the distorted output waveform.

11. A non-transitory computer readable storage medium storing instructions for storing a representation of a distorted waveform for performing timing analysis of an integrated circuit design for manufacturing, the instructions for:
    receiving, by a static timing analyzer, information describing a distorted waveform, the distorted waveform associated with a cell of the integrated circuit design, the integrated circuit design for manufacturing of an integrated circuit;
    determining, by the static timing analyzer, a transition time of the distorted waveform;
    receiving, by the static timing analyzer, information describing a nominal waveform based on the determined transition time;
    for each of a plurality of predetermined voltage levels, computing a difference between the distorted waveform and the nominal waveform;
    storing the computed difference between the distorted waveform and the nominal waveform;
    receiving a request for values of the waveform; and
    determining the requested values of the waveform using the nominal waveform and the stored difference between the distorted waveform.

12. The non-transitory computer readable storage medium of claim 11, further storing instructions for:
    sampling the distorted waveform and the nominal waveform at the plurality of predetermined voltage levels, wherein the sampling rate is higher at a predetermined voltage level where the difference between the distorted waveform and the nominal waveform is larger.

13. The non-transitory computer readable storage medium of claim 11 further storing instructions for storing the determined transition time of the distorted waveform.

14. The non-transitory computer readable storage medium of claim 11 wherein computing the difference between the distorted waveform and the nominal waveform comprises:
    computing the difference between the time at which the distorted waveform reached the predetermined voltage level and the time at which the nominal waveform reached the predetermined voltage level.

15. The non-transitory computer readable storage medium of claim 14 further storing instructions for:

determining a maximum value among each of the computed differences; and normalizing each of the computed differences to the determined maximum value.

16. The non-transitory computer readable storage medium of claim 15 wherein storing the computed differences comprises:

storing a fixed point representation of the normalized differences.

17. A non-transitory computer readable storage medium storing instructions for performing static timing analysis of a cell of an integrated circuit design for manufacturing, the cell including a plurality of connected coupled blocks, the instructions for:

receiving, by a static timing analyzer, an input uncoupled waveform for performing timing analysis of a cell of a circuit, the integrated circuit design for manufacturing;

determining, by the static timing analyzer, a coupled non-monotonic waveform corresponding to the uncoupled input waveform, the coupled non-monotonic waveform obtained by performing timing analysis of the cell, the timing analysis considering impact of crosstalk from another cell;

determining, by the static timing analyzer, a time delay value representing a maximum time shift in the coupled non-monotonic waveform compared to the uncoupled input waveform comprising:

for each voltage level of a plurality of voltage levels of the input waveform, determining a time difference value between a time value at which the uncoupled input waveform has a voltage equal to the voltage level, and a time value at which the coupled non-monotonic waveform has a voltage equal to the voltage level, and determining a maximum value of the time difference values;

generating a time-shifted uncoupled input waveform by shifting the uncoupled input waveform by the determined time delay value; and using the time-shifted uncoupled input waveform instead of the uncoupled input waveform for analysis of the cell.

18. The non-transitory computer readable storage medium of claim 17, wherein determining the non-monotonic waveform comprises:

performing a circuit simulation of the first subset of channel connected blocks, the circuit simulation using the uncoupled input waveform.

19. The non-transitory computer readable storage medium of claim 17, wherein determining the time delay value comprises:

determining a first output waveform of a first subset of the channel connected blocks, using the coupled non-monotonic input waveform as input;

determining a second output waveform of the first subset of the channel coupled blocks, using the uncoupled input waveform as input;

determining time difference values between the first output waveform and the second output waveform for a plurality of voltage levels of the uncoupled input waveform;

determining a maximum value of the time difference values and using the maximum value as the time delay.

* * * * *